May 4, 1954  C. A. PARKER  2,677,498
INDEXING AND ESCAPEMENT MECHANISM
Filed June 14, 1949  5 Sheets-Sheet 1

INVENTOR.
Charles A. Parker
BY
Eugene E. Stevens
ATTORNEY.

May 4, 1954  C. A. PARKER  2,677,498

INDEXING AND ESCAPEMENT MECHANISM

Filed June 14, 1949  5 Sheets-Sheet 2

INVENTOR.
Charles A. Parker
BY
Eugene E. Stevens
ATTORNEY.

May 4, 1954  C. A. PARKER  2,677,498
INDEXING AND ESCAPEMENT MECHANISM
Filed June 14, 1949  5 Sheets-Sheet 4

INVENTOR.
Charles A. Parker
BY
Eugene E. Stevens
ATTORNEY.

Patented May 4, 1954

2,677,498

UNITED STATES PATENT OFFICE 2,677,498

INDEXING AND ESCAPEMENT MECHANISM

Charles A. Parker, Knoxville, Tenn., assignor to Rainey Accounting Machine Company, Inc., Knoxville, Tenn., a corporation of Tennessee Application June 14, 1949, Serial No. 99,082

24 Claims. (Cl. 235—60)

This invention relates generally to mechanical movements involving a member movable in response to a bias, and escapement mechanism for imparting step-by-step movement thereto, in which the escapement is operated from one or more actuators. It is designed to procure high speed operation by utilizing the energy of the biasing means to take over and operate the escapement, and to recondition it for subsequent operation, independently of an actuator immediately following the motivation of that actuator.

At present, the major utility of the invention appears to be in the art of accounting machines, although it is by no means intended to be limited thereto. "Accounting machines" in this specification and in the claims is employed in a generic sense; the term applies to calculating machines, bookkeeping machines, typewriting machines, and all related devices.

The present disclosure deals with an embodiment of the invention as employed in an accounting machine utilizing calculating mechanism of the "ten key" type. In a calculating machine of this type, in conventional practice, a numeral key is depressed by an operator's finger to set a pin in a stop pin box and at the same time to operate an escapement through which the pin box or other pin locating means is permitted to shift for positioning pins of the following row relative to the setting means. The pin setting means presents an obstruction to pins of the following row, which must be removed before the pin box shifts. This removal is accomplished during the upward movement of the depressed key.

The escapement must be held ineffective until the setting means obstruction clears the path of travel of the following row pin. This means that the operator's finger must be raised to near the full, or to the full, upward position in order to complete a step movement of the stop pin box and permit proper operation of the next numeral key. Thus, from an operator's listing of amounts, each digit requires a complete down and up movement of the finger for each numeral key, whether struck in sequence or in repetition. In machines in which the operator's finger movement is the major factor limiting speed, efficiency has a direct relation to muscular control because the physical speed with which an operator can index or enter an item for addition or subtraction depends upon his ability to depress and raise his finger for each key. The present invention eliminates physical finger lifting ability as a governing factor in the operation of calculating machines, and makes possible the indexing of calculating machines at the fast key strike speeds attainable by an expert operator on typewriting machines.

An object of the invention is to provide means for greatly increasing the speed with which the numeral keys of a calculating machine can be operated to enter or index items into the machine.

It is also an object to provide an escapement control for accounting machines, in which the energy of an element moving in response to operation of the escapement is utilized for resetting the escapement immediately following its operation.

A further object is to provide an escapement control mechanism in which energy derived from a member having step-by-step movement at each operation of the escapement is utilized to condition the escapement for an immediate subsequent operation before the moving member has completed a full step following operation of the escapement.

Another object is to provide an improved stop pin box escapement mechanism for calculating machines in which an escapement release rocker is tripped by actuation of a universal element, wherein the energy of a member moving as a result of the rocker tripping is utilized to disengage the rocker from its tripping means for immediate resetting of the rocker and operation of the escapement without regard to the position of the universal element.

Another object is to provide an improved structure and arrangement of stop pin box and pin setting means in cooperation therewith.

Further objects include the provision of novel stop pin retaining and mounting means.

Other objects will be apparent to those skilled in the art. In the accompanying drawings:

In its general aspects, the apparatus includes a plurality of manually operative selective actuators for indexing item figures through the agency of shiftable elements projected against stop pins carried by a mounting member in which the pins are moved to their stop positions under propulsion by the projected elements. Each projector is arranged to move a universal element which trips an escapement to impart step-by-step linear shifting movement to the pin mounting member, which moves in response to a bias to register the pins of a following row with the projectors. Tripping of the escapement effects an initial movement of the pin mounting member. During this initial movement means is operated by the energy of the pin mount moving means to take over control of the escapement and immediately release it for a full step movement of the pin mount, independently of the manual actuators and the universal element. This action is accomplished, and the escapement is reset, before the motivated actuator, which has cycle movement, arrives at the end of its first half cycle. Energy of the pin mount during shifting movement is utilized to remove actuated projectors from the path of following row pins, so that the pin setting means is reconditioned for subsequent operation also before the motivated actuator arrives at the end of its first half cycle.

In detail, the invention comprises a member 15, here shown as a stop pin box mounting the requisite number of stop pins 16, movable in response to the biasing pull of a contractile motoring spring 17 connected between a point of anchorage on the bottom of the pin box and a point of anchorage on an escapement frame 18 that is supported on an upright 19 fixed on the base plate 20 of a machine in which the mechanism is installed. The escapement frame is substantially of known design, having a pair of upright ears 21 carrying trunnions 22 which pivot between them a dog rocker 23 substantially of the structure shown in U. S. Patent No. 1,512,609 of October 21, 1924. The rocker carries a pivoted limber dog 24 and a rigid dog 25 arranged in drop space relation for alternate holding engagement with the teeth of an escapement wheel 26. The limber dog is stepped by a contractile spring 27 on each disengagement from the wheel. A contractile spring 28 connected between the rocker and the escapement frame biases the rocker normally to a limit position in which the limber dog is engaged with a tooth of the escapement wheel. A stop 29 fixed to the escapement frame overlies the rocker and determines its limit position. When the rocker is moved against the tension of the spring 28 to its opposite limit position contacting the escapement frame, the rigid dog 25 moves to engage the wheel tooth freed by the limber dog.

Figures 8, 10:
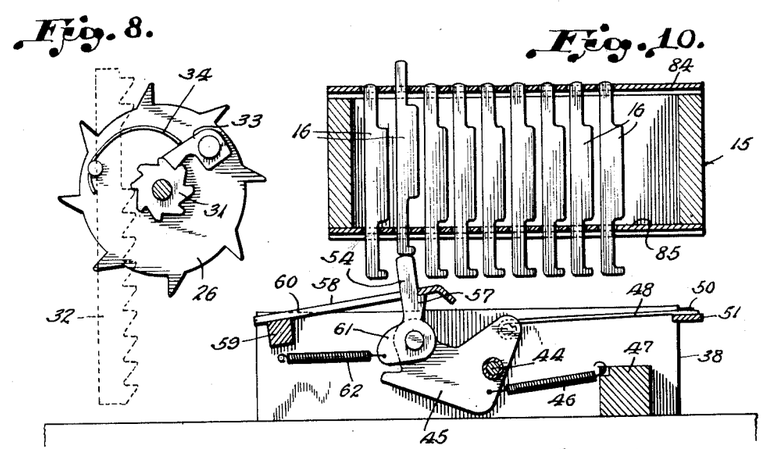
Figure 8 is a section on line 8—8 of Figure 1.
Figure 10 is a section similar to Figure 9 illustrating the position of the parts in a pin setting operation.

The escapement wheel 26 forms part of rack means movable with and by the pin box 15 in response to its bias. The wheel is rotatable on a vertical axis at the upper end of a supporting post 30 that is secured to the machine base plate and which may be a part of the escapement frame. A pinion 31 loose on the axis of the escapement wheel meshes with a rack bar 32 attached to the pin box at one side thereof. As shown in Figure 8, the wheel 26 carries a pivoted dog 33 on its under face yieldingly engaged with the pinion teeth by a biasing spring 34, whereby the wheel is driven by the rack bar in the advancing pin-locating movement of the pin box but not when the box is returned in the opposite direction. A spring finger 35 mounted at one end on the escapement frame has its free end in detent relation to the teeth of the escapement wheel to check it against retrograde movement.

Due to the drop spacing of the rocker dogs the escapement wheel, and consequently the pin box 15, ordinarily is permitted a slight initial movement each time the rocker is tripped to disengage the limber dog 24; otherwise stated, whenever the rocker is tripped the pin box 15 shifts under the pull of its motor spring 17 until arrested by the engagement of the rigid dog 25 with the escapement wheel tooth which was freed for movement by the limber dog when rocked out of engagement with the tooth. When the escapement is released to rock back to its untripped position; that is, when the rigid dog is disengaged from the position to be contacted by the tooth of the escapement wheel, the pin box then will move one full step, and the following tooth of the wheel is engaged against the stepped limber dog. When this occurs the escapement is reset for a subsequent operation.

Figure 15:
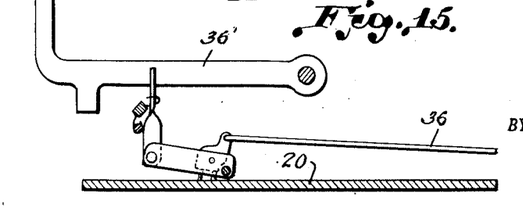
Figure 15 is a fragmentary elevation of a numeral key action.

A highly important feature of this invention resides in the provision of means operated by the escapement wheel, in the course of its initial movement, to free the escapement from its actuator 69 or 79 before the wheel tooth disengaged by the limber dog can engage the rigid dog. In this invention, the rigid dog set by the tripping of the escapment has already been moved out of the path of the disengaged wheel tooth before that tooth arrives at the point at which it ordinarily would engage the rigid dog if the escapement were not freed. The result is that at the end of the initial "drop" movement, the escapement wheel, and consequently the pin box, continues without interruption through a full step movement. Tripping of the escapement dog rocker is accomplished by the manipulation of any of a plurality of actuator instrumentalities 36, shown in this embodiment as pull wires from the numeral keys of the machine, one of which is shown as a manually depressible key 36' in Figure 15.

The pin setting means comprises a unit secured on the base plate 20 beneath the pin box 15 and providing a support on which the pin box shifts. It consists of a frame having a front side piece 37 and a rear side piece 38 in end attachment with uprights 39 fixed on the base plate. The side pieces are disposed in spaced parallel relation conforming with the width of the pin box, and they extend longitudinally of its path of travel. The pin box has affixed to its rear side a depending bracket 40 in which is journalled a bearing roller 41 that provides rolling support for the pin box on the flat top face of the rear side piece 38 of the setting means frame. Slide bearing sleeves 42 carried by the pin box on its front side engage a guide rod 43 that extends longitudinally between the uprights 39 above the frame front side piece 37; so that the sleeves and bearing roller provide plural point support for the pin box.

Figure 9:
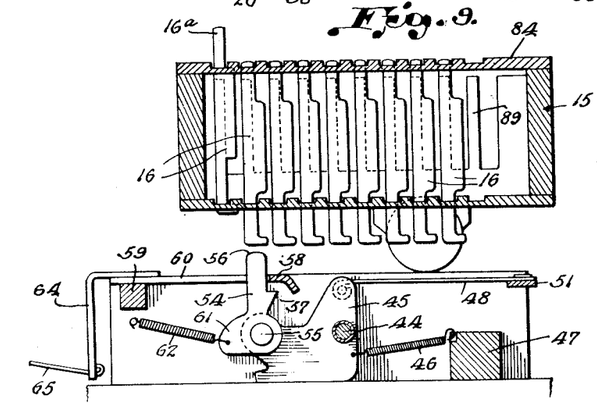
Figure 9 is a section on line 9—9 of Figure 3.

A shaft 44 extends transversely across the pin setting unit between its front and rear side pieces and provides a fulcrum mount on which are pivoted a series of rocker members 45. These rocker members are flat plates which pivot on the shaft 44 to rock or oscillate in a vertical plane. The members correspond in number to the numeral keys of the machine in which the unit is mounted. Each rocker 45 normally is held in the position illustrated in Figure 9 by means of a contractile spring 46 attached at one end to a point of anchorage on the rocker and at its other end to a point of anchorage on a mounting block 47 secured on the base plate of the setting unit. Each rocker has a vertical edge substantially at right angles to a horizontal bottom edge, and the fulcrum of the rocker lies in the vertical portion. The bottom edge of the rocker normally seats against the base of the machine and determines the limit position of rest for the rocker under the bias of its spring 46. A pull wire 48, one for each rocker, has pivotal connection at one end with a lateral stud 49 on the rocker and at its other end it is in pivotal connection as at 50 with an individual bell crank lever 51 that is pivoted for horizontal oscillation in the front side piece 37 of the pin setting unit frame.

Figure 1:
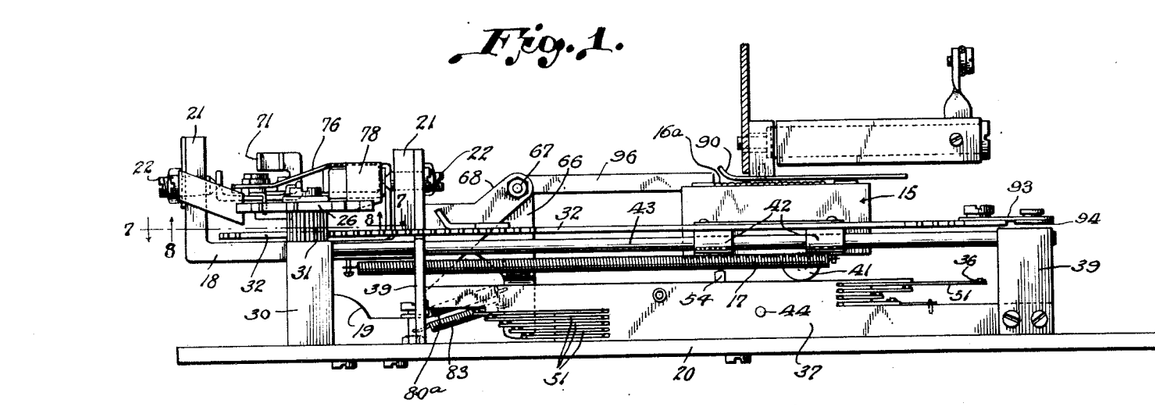
Figure 1 is an elevation of an embodiment of the invention as incorporated in the stop pin box and escapement mechanism of a "ten key" calculating machine.
Figure 2:
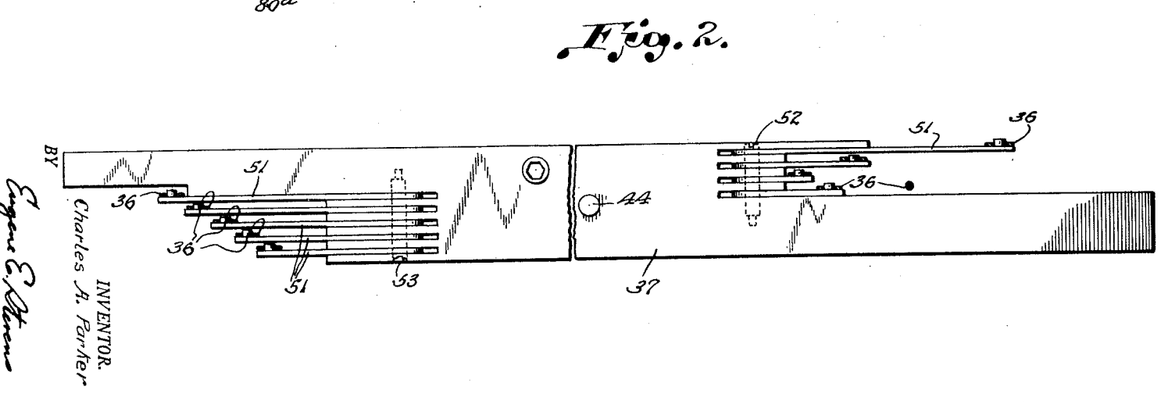
Figure 2 is an enlarged elevation of the lever mounting plate of the pin setting means shown in Figure 1.
Figures 3, 4, 5:
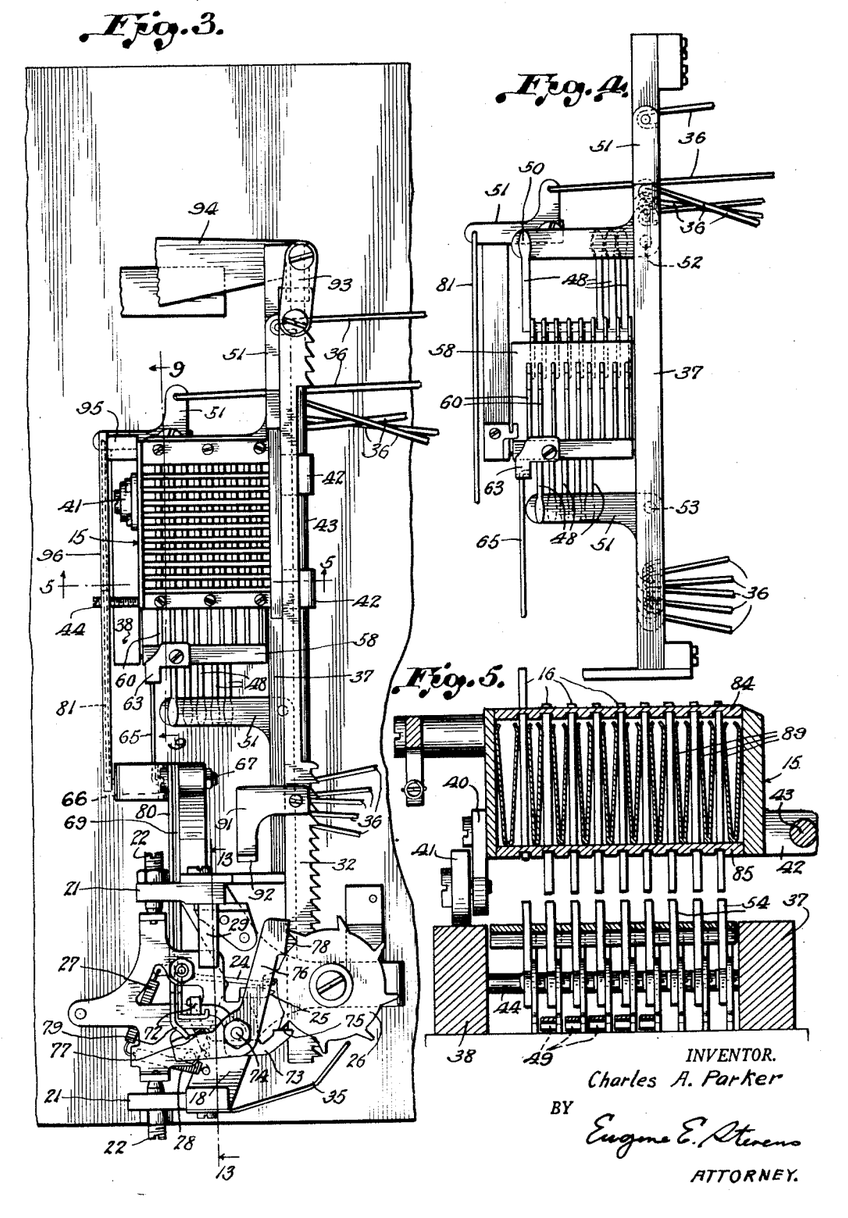
Figure 3 is substantially a top plan view with respect to Figure 1.
Figure 4 is a top plan view of the pin setting means and the escapement universal.
Figure 5 is a section on line 5—5 of Figure 3.

Each bell crank lever 51 has one arm pivotally connected to the associated pull wire 48 and its other arm is pivotally connected with the rear end of its associated actuator 36. As the structure of the bell crank levers 51 is substantially identical except for arm lengths and location, it is not considered necessary to refer to each lever by a different descriptive numeral. The levers are given the general designation 51. These levers, except for that of the numeral "9" key, are arranged in groups. The group at the right hand side, with respect to Figures 2, 3 and 4, is superimposed on a common pivot 52 mounted in the front side piece 37 of the unit frame. The group on the left hand side is disposed on a common pivot 53 also mounted in the frame side piece, but the group at the left is reversed with respect to the right hand group for obvious reasons. By way of illustration, it is pointed out that in this embodiment of the invention the bell crank in connection with the actuator 36 at the extreme right in Figures 3 and 4 is that of the zero key, while the one second from the right is that of the numeral "9" key. This arrangement may be altered as the keys may be disposed in any desired manner.

Each rocker member 45 carries thereon a relatively movable interponent 54. In this embodiment of the invention the interponent consists of a flat finger pivoted as at 55 on the side of its associated rocker to swing in the plane of the rocker. The shank of the finger extends upwardly above the top of the setting unit frame in slightly spaced relation below the bottom ends of the series of pins 16 mounted in the pin box. The upper end of the finger has a rounded tip 56 and its shank portion is formed with a latch shoulder 57 that normally underlies the adjacent end portion of a universal plate 58 which at its other end is secured to a mounting element 59 extended transversely between the frame side pieces 37 and 38 and pivotally supported therein to rock in a vertical plane. The series of interponents 54 is disposed through slots 60 extending longitudinally in the universal plate. These slots provide guides in which the fingers play in their stop pin projecting action. Each finger 54 has a heel portion 61 that provides a point of attachment for one end of a contractile spring 62 which is anchored to the unit frame at its opposite end. The spring 62 provides a bias normally holding the interponent finger in a vertical position in engagement against the end of the slot in the universal plate. By reason of the presence of the shoulder 57, each interponent is adapted to engage and carry up with it the end of the universal plate whenever the rocker member for that interponent is actuated in an indexing operation. This indexing actuation is shown in Fig. 10, in which the rocker member has been rocked to lift the interponent to engage and elevate its registered stop pin in the stop pin box.

Figure 6:
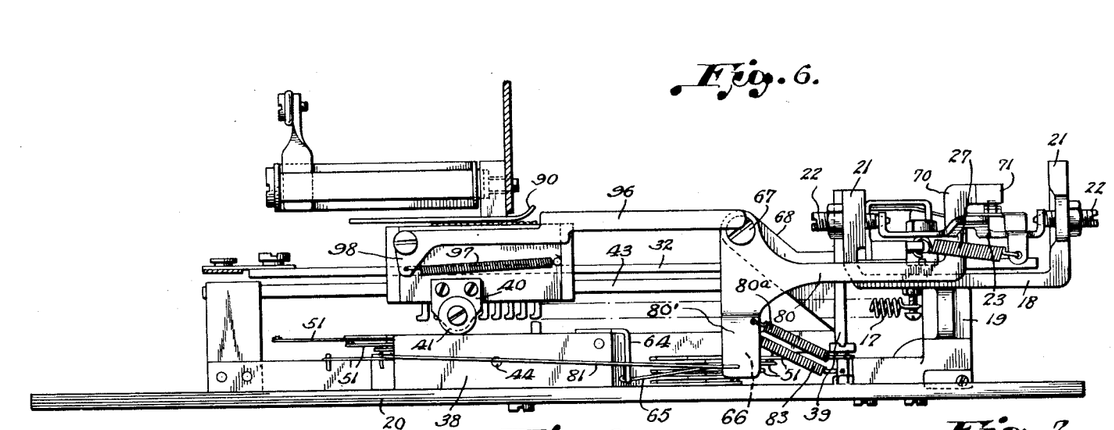
Figure 6 is a rear elevation with respect to Figure 1.
Figure 7:
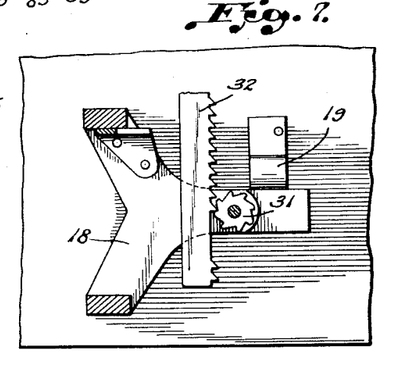
Figure 7 is a section on the line 7—7 of Figure 1.

An extension 63 secured to the universal plate 58 has an integral downwardly directed arm 64 disposed beyond the adjacent end of the setting unit frame, as best shown in Fig. 6. At its lower end this arm 64 has operative connection by means of a pull wire 65 with the lower end of a bell crank lever 66 that is adapted for oscillation in a vertical plane on a fulcrum 67 that is carried in a supporting element 68 of the escapement rocker frame 19. The long arm 69 of the bell crank lever 66 extends horizontally into the region of the escapement rocker and at its free end is formed with an upwardly directed portion 70 that terminates in a laterally directed tip 71. The lower edge of the tip 71 overrides and engages a lug 72 mounted on one end of a lever 73 that is pivoted as at 74 intermediate its ends on the plate of the escapement dog rocker. The opposite end of the lever 73 has a tip 75 that is normally retained in contact with a tooth of the escapement wheel 26 by a biasing spring. Also fulcrumed on the pivot 74, and immediately overlying the lever 73, is a second lever 76. A contractile spring 77 extending between a point of anchorage on the lever 76 and a point of anchorage on the lever 73 normally tends to draw the adjacent ends of the two levers together. The free end of the lever 76 has a downturned tip 78 which normally is held against another tooth of the escapement wheel 26 by the biasing action of the spring 77. The free end of the second lever 76 underlies the engaging tip 79 of the horizontal arm 80 of a second bell crank lever that also is fulcrumed on the pivot 67 alongside the lever 69. The bottom end of the short arm 80 of this second bell crank lever 80 has operating connection by means of a pull wire 81 with an arm of the bell crank lever 51 for the numeral "9" key. A contractile spring 80a between the lever arm 80' and a fixed element of the machine biases the lever in its normal position.

Normally, both the universal plate-connected lever 69 and the numeral "9" key lever 80 are engaged at their free end terminal portions with the respective levers 73 and 76 that are pivoted for rocking movement on the dog rocker escapement plate. In consequence, when either lever is rocked on its fulcrum by upward tilting of the universal plate or by actuation of the numeral "9" key bell crank, the corresponding downward movement of the levers and escapement rocker plate trips the escapement to carry its limber dog out of engagement with the tooth of the escapement wheel.

As soon as this tripping of the escapement occurs the escapement wheel turns slightly through the "drop," as previously described, under the bias of the pin box shifting means which in this instance is the motor spring 17. This slight rotation of the escapement wheel is evidenced immediately in the camming action of the wheel teeth against the ends of the levers 73 and 76 which rock on their pivots against the bias of their intermediate spring 77. This rocking movement, although slight, is sufficient to disengage these levers from the holding down action of the terminal portions of the bell cranks 69 and 80, so that the escapement dog rocker is immediately freed for movement under the action of its biasing spring to free its rigid dog and to permit a full step shifting movement of the stop pin box. As previously described, this freeing of the tripped escapement dog rocker takes place under the energy of the pin box shifting means and during the initial downward movement of whatever key has been struck to enter an item in the machine.

Figure 11:
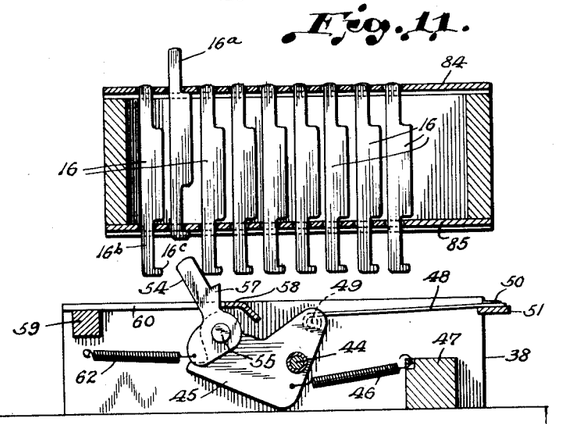
Figure 11 is a section similar to Figure 9 illustrating the obstruction removing action of the pin box assembly.
Figure 12:
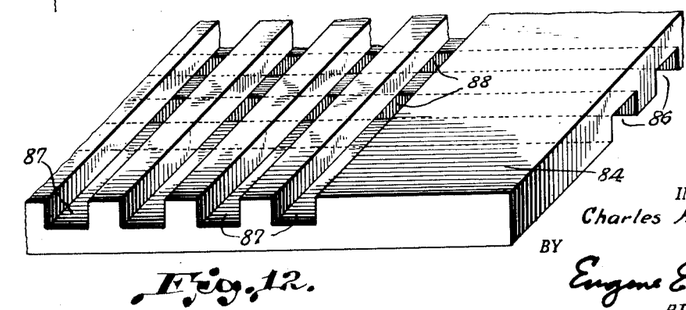
Figure 12 is a perspective view of a stop pin guide plate.
Figure 13:
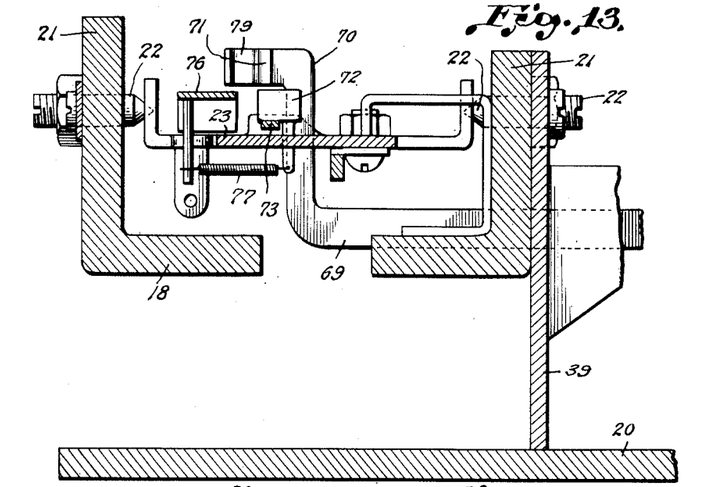
Figure 13 is an enlarged section taken on line 13—13 of Figure 3.
Figure 14:
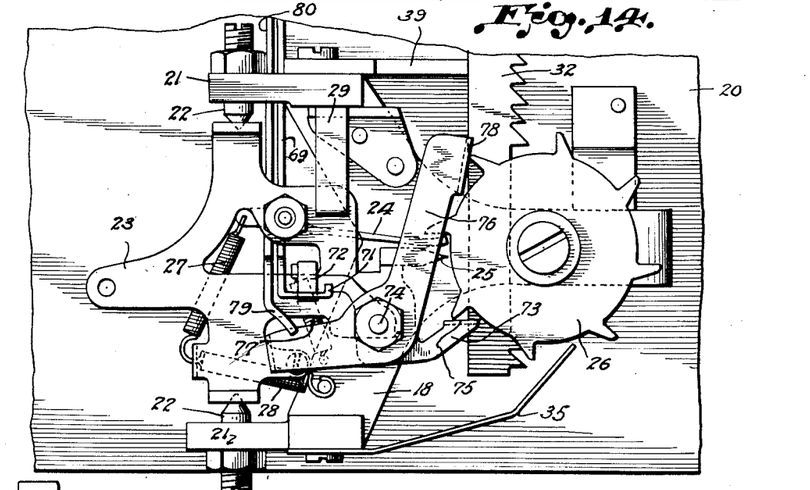
Figure 14 is an enlargement of detail in Figure 3.

During downward movement of the motivated key, its associated pin setting unit bell crank 51 operates to swing the associated rocker 45 to its fulcrum to project its interponent 54 up into contact with the lower end of a registering pin in the pin box whereby the pin is pushed upwardly into its appropriate set position. In moving upwardly the interponent lifts the universal plate and is held in latched engagement therewith by the action of the biasing spring 62. In this position of the parts, as shown in Fig. 10, the interponent is in obstruction relation to following pins of the row in which a pin has been moved to set position by the rising movement of the interponent. As soon as the pin box shifts, which occurs almost immediately following setting of the pin, the next adjacent following pin of the row engages against the upstanding interponent and rocks it on its pivot 55 downwardly, as indicated in Fig. 11, until it has been moved out of pin obstructing position. This rocking movement of the interponent under the camming action of a following pin releases the latch shoulder 57 from its engagement with the universal plate and allows the plate to drop down to normal position under the urge of the biasing spring 63 connected between the lever 66 and a point of anchorage on a frame element. The interponent is thus moved out of the path of the following pins so that the pin box is free to complete its shifting movement. Further downward retracting movement of the interponent is at the rate of movement of its carrier rocker 45 under the bias of its own retracting spring 49. This movement occurs during the second half cycle of key movement in its up stroke and is relatively much slower than the speed at which the interponent is moved out of its obstructing position. Following disengagement of the interponent latch, the biasing spring 62 returns the interponent to its normal position with the latch shoulder disposed beneath the front end of the universal plate.

As best shown in Fig. 5, the pin box itself is a rectangular frame having front and rear side plates and transversely extended end plates. The box is closed at its top by a plate 84 and at its bottom by a plate 85. These plates are of metal stock that is milled from its opposite faces to provide longitudinal channels 86 in one face and transversely extended identical channels 87 in its other face. These channels are grooves of rectangular cross section and their depth is such that they meet in the median plane of the plate and thus provide the appropriate number of rectangular guide apertures 88 through the body of the plate. The stop pins 16 have upper end extensions 16d which reciprocate through the guide apertures in the top plate and have similar lower end extensions 16b which reciprocate through the guide apertures in the bottom plate. The lower ends of the stop pins have foot portions 16c for engagement by the registering interponents of the pin setting unit. The central portion of each stop pin is laterally enlarged to provide a bearing face that is frictionally engaged at each side of the pin by a series of spring fingers 89. These spring fingers are substantially of comb structure arranged in divergent relation so that they bear resiliently against the adjacent faces of the stop pins and provide a frictional grip which holds the pins in the positions to which they are moved by the action of the pin setting means. When the pin box is returned to its original position following an indexing operation the projected pins ride beneath the usual depresser plate 90 which forces the pins down into their original positions in the pin box.

The rack bar 22 has rigidly secured thereto a bracket 91 provided with a contact lug 92 that engages the limber dog 24 when the stop pin box arrives at the extreme limit of its shifting movement during maximum capacity indexing of an item. This engagement prevents stepping of the limber dog and maintains it in proper position to reengage the tooth of the escapement wheel 26 from which it would be disengaged if an extra actuation were given the escapement.

At its right hand end the rack bar has operating connection by means of a link 93 with a restoring lever 94. This lever 94 operates in returning the pin box to its original position and also in moving the pin box for destroying an item. It is actuated by conventional means, not shown. The pin box is provided on its rear face with an extension 95 which provides a pivot for one end of the conventional stop slide lever 96. A biasing spring 97 connected between a point of anchorage on the rear face of the pin box and a heel 98 of the slide stop lever normally urges the lever 96 into its upper operative position as shown in Fig. 6.

Prior to an indexing operation, the parts of the mechanism are in the positions illustrated in Figs. 1, 3, 4 and 6. In this position of the parts the escapement rocker plate 23 is held by its biasing spring with its limber dog 24 engaging a tooth of the escapement wheel so that the stop pin box is retained in its extreme right hand position against movement under the bias of its motor spring 17 which tends to pull the box toward the left. Upon the striking of any digit key in an indexing operation the associated actuator 36 exerts a pull on its connected bell crank lever 51 which, in turn, operating through its connection 48, rocks the connected pin setting rocker 45 to elevate its interponent 54 through the universal plate slot so that the rounded tip of the interponent forcibly strikes against the foot of its registering pin box stop pin 16. This upward movement of the interponent is a quick strike that propels the stop pin forcibly upward to its extreme upper limit as shown in Fig. 11. The momentum of the action carries the stop pin upwardly above the tip of the interponent. At the same time the latch shoulder 57 on the interponent elevates the end of the universal plate 58 which rocks on its pivot to exert a pull on the connecting wire 65. This wire correspondingly rocks its connected bell crank lever 66 on the fulcrum 67 which correspondingly depresses the long arm 69 of the bell crank lever which, at its terminal portion 71, overlies and engages the lug 72 of the pivoted lever 73 that is carried by the dog rocker plate. This action depresses the dog rocker plate against the action of its biasing spring and disengages the limber dog, whereupon the escapement wheel turns.

The initial movement of the escapement wheel 26 cams the lever 73 so that it rocks on its pivot 74 to disengage its lug 72 from beneath the overriding end of the actuator lever 71. This release immediately enables the pull of the dog rocker biasing spring 28 to become effective to rock the rocker plate 23 back to its original limit position whereby the escapement wheel is permitted a full step turn until its following tooth is engaged by the stepped limber dog. This full step movement is imparted to the pin box. This action releasing the escapement for a full step shift of the pin box following the tripping takes place under the energy of the pin box motor spring 17 and before the motivated digit key has reached the end of its down stroke. In the case of the numeral "9" key the operation is the same except that the long arm 80 of its associated actuator is operated through the pull wire 81 instead of through the universal plate. In this case the lever 75 is rocked on its pivot 74 by cam action of wheel 26 on ear 76 to disengage the tip 19 of the lever arm 80 and thereby to free the escapement from action of lever arm 80 for a full step shift of the pin box.

When any one of the interponents 54 is projected to set a pin in the pin box it occupies the position shown in Fig. 10 in obstructing relation to following pins of that row in which a pin has been set. As shown in Fig. 11, the immediately following pin moving with the pin box engages against the shank of the interponent and cams it downwardly about its pivot 55 against the bias of the spring 62 until it has been moved out of the path of the following pin. This action of the interponent releases the universal plate latch and permits the universal plate to return to its initial position. The interponent is thereafter restored to its initial position by the returning movement of its rocker 45 under the pull of its biasing spring 46.

The same shifting movement of the pin box which removes the projected interponent from its obstructing position has already, in its initial portion, resulted in releasing the escapement as previously described, so that it is reset for another operation. This resetting is accomplished by the time the latch of the projected interponent is disengaged from the universal plate. It is therefore possible to actuate another of the rockers 45, for instance by striking another key, so closely following the actuation of the one preceding that the universal plate has not completed its drop after being disengaged by the latch of the preceding interponent; otherwise stated, a second key may be depressed to effect another full indexing and shift of the pin box by the time the preceding key starts its upstroke back to initial position. This is also possible for a third and all keys subsequently struck, for the universal plate may be rocked upwardly by any interponent at any instant following disengagement of the plate by the latch of an immediately preceding elevated interponent. Thus, not only is speed obtained in presenting another row of stop pins for setting, but also because consecutive settings of pins in the following rows can take place from other key actions or interponents before or during the time previously projected interponents are returning to their initial normal position.

This invention contemplates within its purview the use of any known type of escapement capable of effecting a step-by-step movement of a member that moves in response to a bias upon operation of the escapement. The specific escapement shown is by way of example only, for compliance with statutory requirements, and is not restrictive.

Another highly important feature of the invention is that of escapement control from the member movable under a bias in response to operation of the escapement. In the present embodiment, upward rocking of the universal 58 trips the escapement and effects the initial "drop" movement of the escapement wheel and pin box. Energy derived from the pin box motor spring, acting through the escapement wheel and the levers 73 and 76 on the dog rocker, is employed to free the dog rocker for a full step movement of the pin box. It may be desirable in some installations to dispense with the dog rocker mounted levers 73 and 76 and to free the escapement by action of the universal member. In such case the two levers may be entirely removed from the dog rocker plate or they may be uncoupled from their biasing spring 77 and moved to a position in which they are out of engagement with the escapement wheel teeth and also the tip 71 and the tip 79 of the respective bell cranks connected to the universal and to the numeral "9" key action. These tips 71 and 79 are then adapted to engage directly against the rocker plate for direct operation of the dog rocker.

With the parts thus arranged, or with another design of escapement instead of that here shown, the operation of the escapement is under the control of the universal element. This element is motivated through the intermediary of a driving connection from any actuator with which it is associated. The driving connection from each actuator includes means for returning it to initial condition following depression of the actuator, in accordance with conventional practice. Instead of relying upon the action of the returning means to recondition the universal for a following actuation thereof, this invention utilizes the energy of the pin box moving means to recondition the universal element for a following actuation.

When the universal, here shown as the plate 58, is lifted by any of the interponents 54 to operate the escapement, the latch of the interponent is disengaged from the plate by the camming action of a following pin almost immediately after the pin box begins to move, so that the plate is again in condition for actuation by another interponent, as previously described. It will be apparent that in the practice of this invention reconditioning of the universal is effected far more rapidly than is possible in conventional practice. As the escapement is operated upon each actuation of the universal, it follows that it also may be operated far more rapidly than is possible in conventional practice.

Operation of the escapement to effect a full step movement of the stop pin box, followed by an immediate reconditioning of the escapement for a subsequent operation by depression of the same or another key, makes it possible for an operator to use both hands and at the same speed and rhythm at which typewriter keys are struck.

Another factor making possible such high speed operation is the control of the escapement by two relatively widely separated instrumentalities working individually or in unison under force transmitted from the main motoring spring 17 that biases the pin box. One is the camming of the levers 73 and 76 by the escapement wheel, and the other is the camming of the interponents 54 by following pins in the pin box. Whichever works the faster upon the depression of a key is the one that reconditions the escapement for subsequent operation. Neither is dependent upon the other.

I claim:

1. In combination, a member movable in response to a bias, an escapement having an element normally obstructing said movable member in a manner to permit step-by-step movement thereof during each operation of the escapement mechanism, an actuator for operation of the escapement mechanism, a driving connection between said actuator and the escapement for operating the latter in the down stroke of the actuator, and means operative by said member in the course of its initial movement to release the escapement from its actuator thereby to free the escapement to be returned independently of the actuator to its original position of adjustment while the member is permitted to make a full step movement in response to its bias.

2. In combination, a member movable in response to a bias, an escapement for imparting step-by-step movement thereto, a plurality of manually selective depressible actuators, a universal element operative from any one of the actuators during its down stroke, a driving connection between the universal element and the escapement for operating the latter in the down stroke of an actuator, the escapement including means effecting an initial movement of the member upon operation of the escapement, and means operative by said member in the course of its initial movement to effect release of any of the actuators from their driving connection with the universal element to permit independent return movement of the escapement mechanism independent of the actuator while the down-stroke position of any depressed actuator is maintained whereby a full step movement of said member can result in response to its bias.

3. In combination, a member movable in response to a bias, an escapement mechanism for imparting step-by-step movement thereto and including a pair of stops adapted to engage said member and alternately movable bodily out of engagement therewith, a plurality of actuators, a universal element operative from any one of the actuators, stop driving means between the universal element and the stops movable by operation of the universal element to disengage an engaged stop, and means operative by said biased member moving in response to its bias for releasing said stop driving means from between said universal element and said escapement to permit return of said escapement mechanism independent of said universal element and to return said stop to engaging position.

4. In an accounting machine having a carriage provided with rack means, a means for moving the carriage and an escapement therefor including a pair of dogs adapted to engage an element of the rack means alternately in carriage arresting relation; an actuator common to both dogs for moving same simultaneously and means operative by energy of the carriage moving means to effect release of the dogs from their actuator when one dog is moved for rack engagement of the other dog.

5. In an accounting machine, a carriage; an escapement therefor including a dog rocker, a spring normally holding the rocker against movement, and an escapement wheel, spring means for constantly urging said wheel for movement in one direction; a member pivoted on the rocker and biased into camming engagement with the escapement wheel; a depressible key, means operated by the key during its down stroke to engage the rocker-carried member to rock and hold the dog rocker against the tension of its spring; and said member having an extension to contact said wheel and pivot by the camming action of the escapement wheel during initial movement to disengage the key operated means to release the rocker.

6. In an accounting machine, a carriage; an escapement mechanism therefor including a rocker having a limber dog and a rigid dog in drop space relation, a spring normally holding the rocker against movement, and a toothed escapement wheel adapted to be alternately engaged by the dogs; a member carried by and movable on the dog rocker; an actuator engageable with said member for rocking and holding the dog rocker against the tension of its spring; and said member having cooperative camming engagement with a tooth of the escapement wheel whereby, as the wheel turns through the dog drop space, said member is moved on the rocker to disengage the actuator and thus release the rocker.

7. In an accounting machine, a plurality of actuators, a member biased to move in response to the manipulation of any one of the actuators, escapement mechanism biased to a normal holding engagement with said member preventing movement thereof, an operating connection between each actuator and the escapement for releasing the holding engagement of the escapement against its bias, and said escapement including means operative immediately by the released movable member to disengage said operating connection for restoration of the escapement to condition for a subsequent operation.

8. In a calculating machine having a stop pin box and a pin setting unit, one being shiftable relative to the other, motor means for effecting a shift therebetween, a member movable in the setting unit in response to indexing operation, a spring normally holding the member against movement, an interponent movable on said member and bodily movable thereby during its indexing operation to a position in obstructing relation to a row of pins in the pin box to engage and set a pin in that row, a spring normally holding the interponent disposed in pin engageable position, and means mounting said interponent on said member whereby to enable said interponent upon contact by an element of the pin box for movement out of the line of following pins in the row during a shift between the pin box and the pin setting unit and before the member on which the interponent is carried returns to its normal spring-held position of the path of the pins.

9. In a machine having operating elements and an escapement rack operating member adapted to be successively displaced by predetermined increments upon actuation of said operating elements, an escapement mechanism operatively connecting each of said operating elements with said rack operating member to enable displacement thereof upon actuation of said operating element, means responsive to initial displacement of said operating member to enable return of the escapement mechanism to its original position of adjustment independent of said operating elements and rack operating member, means constantly urging said escapement mechanism toward its original position of adjustment, a second escapement mechanism independent of the first and operatively connecting some of said operating elements with said rack operating member for displacement thereof upon actuation of respective operating elements, and other means to recondition said second escapement mechanism to its original position of adjustment responsive to initial displacement of said rack operating member.

10. In a calculating machine, the combination of a member mounted for step-by-step movement responsive to operation of numeral keys, an escapement mechanism having an element shiftable between release and normal positions of adjustment obstructing the movable member in a manner to permit step-wise movement upon each operation of the escapement mechanism, an actuator movable from and to normal positions of adjustment for operation of said escapement mechanism, means normally positioned to effect operative engagement between said actuator and escapement mechanism for transmitting movement from said actuator to said escapement mechanism for operation thereof, and means movable with said member for releasing said first means from operative engagement between said actuator and escapement mechanism whereby the latter is able to return to normal position of adjustment independent of the actuator.

11. In a calculating machine, the combination of a member constantly urged for movement in one direction, an escapement mechanism having an element shiftable between release and normal positions of adjustment operatively engaging the movable member to permit stepwise movement thereof during each operation of the escapement mechanism, an actuator movable from and to normal positions of adjustment for operation of said escapement mechanism, means positioned to establish operative engagement between said actuator and escapement mechanism for transmitting movement from said actuator to said escapement mechanism for operation thereof, and releasing means movable with initial movement of said member for releasing said first means from operative position between said actuator and escapement mechanism whereby the latter is able to return to its normal position of adjustment independent of the actuator.

12. In a calculating machine, the combination of a member constantly urged for movement in one direction during each operation of a calculator key, an escapement mechanism having an element rockable between release and normal positions of adjustment and having members which obstruct the movable member in a manner to permit stepwise movement thereof upon each operation of the escapement mechanism, an actuator movable upon each operation of the key from and to normal positions of adjustment for operation of said escapement mechanism, an interponent positioned between said actuator and said escapement mechanism for transmitting movement of said actuator into movement of said escapement mechanism for operation thereof to release the movable member for stepwise movement, and an operative connection between said member and said interponent to remove said interponent from between the actuator and the escapement mechanism upon initial movement of said member in the direction to which it is urged to permit return of said escapement mechanism to normal position independent of said actuator.

13. In a calculating machine, the combination of a shiftable member constantly urged for movement in one direction, an escapement member having an element shiftable between a normal position obstructing movement of said member in the direction to which it is urged and a position releasing said member for stepwise movement in the direction to which it is urged during operation, an actuator for operation of said escapement element mounted for movement between normal and operated positions of adjustment, an element shiftable between a normal position operatively engaging said escapement mechanism and said actuator for transmitting movement from said actuator to said escapement mechanism for operation thereof, and an operative connection between said member and element when in normal position of adjustment for releasing the operative engagement between said element and escapement mechanism upon initial movement of said member thereby to permit return of said escapement mechanism to normal position independent of said actuator.

14. In a calculating machine, the combination of a shiftable member constantly urged for movement in one direction, an escapement member having an element mounted for rocking movement between normal positions of adjustment obstructing movement of said member and a position releasing said member in stepwise movement in a direction to which it is urged, an actuator mounted for movement between normal and operative positions of adjustment upon each operation of a key for operating said escapement mechanism, an interponent mounted for shifting movement and having one portion thereof positioned between said actuator and escapement mechanism for transmitting movement from said actuator to said escapement mechanism for operation thereof, and means responsive to initial movement of said member in the direction to which it is urged for shifting said interponent from between said actuator and escapement mechanism to permit release thereof for return independent of the actuator.

15. In a calculating machine, the combination of a shiftable member constantly urged for movement in one direction, an escapement member having an element mounted for rocking movement between normal positions of adjustment obstructing movement of said member and a position releasing said member in stepwise movement in a direction to which it is urged, an actuator mounted for movement between normal and operative positions of adjustment upon each operation of a key for operating said escapement mechanism, an interponent mounted for shifting movement and having one portion positioned between said actuator and escapement mechanism for establishing an operative connection therebetween and an extension positioned operatively to be engaged by said member for movement thereof during initial movement of said movable member to displace the portion from between said actuator and escapement mechanism whereby the escapement mechanism is free to return to its original position of adjustment independent of the actuator.

16. In a calculating machine as claimed in claim 15 in which the extension is dimensioned to remain in operative engagement with the movable member only for an initial portion of its stepwise movement thereby to release the interponent for return to its original position of adjustment before full movement of said member has been completed.

17. In a calculating machine as claimed in claim 15 which includes means constantly urging said escapement mechanism toward normal position of adjustment.

18. In a calculating machine as claimed in claim 15 including means constantly urging said interponent toward normal position of adjustment.

19. In a calculating machine, a stop pin box having pins arranged in rows therein, an escapement mechanism for imparting step-by-step movement thereto responsive to setting of a pin so that one row of pins follows another to predetermined pin setting position, pin setting means including selectively operated pin projectors which in operated position are disposed in the path of the oncoming rows of pins, means responsive to movement of the selected pin projector to pin setting position for actuation of said escapement mechanism, and means responsive to operation of said escapement mechanism for displacing said pin projector in operated position from the path of oncoming pins.

20. In a calculating machine, a stop pin box having pins arranged in rows therein, an escapement mechanism for imparting step-by-step movement thereto responsive to setting of a pin so that one row of pins follows another to predetermined pin setting position, pin setting means including selectively operated pin projectors which in operative position are disposed in the path of the oncoming rows of pins, means responsive to movement of the selective pin projector to pin setting position for operation of said escapement mechanism, and means responsive to movement of said stop pin box for displacing said pin projector in operated position from the path of oncoming pins.

21. In a calculating machine, a stop pin box having pins arranged in rows therein, an escapement mechanism for imparting step-by-step movement thereto responsive to setting of a pin so that one row of pins follows another to predetermined pin setting position, pin setting means including selectively operated pin projectors which in operated position are disposed in the path of the oncoming rows of pins, means responsive to latching engagement with the operated pin projector during movement to operated pin setting position for actuating the pin setting position, and means responsive to said escapement mechanism for displacing the operated pin from the path of the oncoming rows of pins simultaneously to release the escapement actuating means for subsequent operation.

22. In a calculating machine, a stop pin box having pins arranged in rows therein, an escapement mechanism for imparting step-by-step movement thereto responsive to setting of a pin so that one row of pins follows another to predetermined pin setting position, pin setting means including selectively operated pin projectors which in operated position are disposed at a higher level than the remainder and substantially in the path of oncoming rows of pins, a plate mounted for rocking movement between positions for actuating the escapement mechanism and return to normal position, a ledge on said pin projectors for engaging said plate when in normal position for rocking movement thereof to actuating position upon movement of a pin projector to operated position, and means responsive to operation of said escapement mechanism for rocking said operated pin projector from the path of the oncoming pins simultaneously to withdraw the ledge from operating engagement with said plate to release same for return to normal position.

23. A calculating machine as claimed in claim 22 which includes means constantly urging said plate to return to normal position.

24. In a calculating machine having a stop pin box having pins arranged in rows therein, an escapement for effecting step by step movement thereof so that one row of pins follows another to predetermined position, and a pin setting unit in cooperative relation to the pin box, a plurality of members movable to pin setting position in the pin setting unit, selector actuator means controlling the movement of said members, a universal plate having guide means for the members movable in the pin setting unit by propulsion from any one of the pin setting members in the course of its movement to pin setting position, a driving connection between the universal plate and the escapement for operating the escapement on movement of the universal plate, and latch means on each pin setting member adapted operatively to engage the universal plate for actuation thereof on operation of the member, said pin setting member being shiftable to inoperative position of adjustment responsive to movement and engagement of the pin box therewith.

References Cited in the file of this patent

UNITED STATES PATENTS

| Number | Name | Date |
|---|---|---|
| 923,269 | Johantgen | June 1, 1909 |
| 1,117,405 | Kurowski | Nov. 17, 1914 |
| 1,282,823 | Hart | Oct. 29, 1918 |
| 2,055,561 | Saunders | Sept. 29, 1936 |
| 2,062,963 | Benninger | Dec. 1, 1936 |
| 2,100,071 | Eibert | Nov. 23, 1937 |

FOREIGN PATENTS

| Number | Country | Date |
|---|---|---|
| 409,972 | Great Britain | May 10, 1934 |
| 679,656 | France | Jan. 13, 1930 |